Aug. 28, 1962 J. W. REED ETAL 3,050,837
RAILROAD WHEEL MOUNTING PRESS
Filed Oct. 24, 1958 14 Sheets-Sheet 1

INVENTORS
JOHN W. REED
HENRY J. HALVORSEN
PETER HOLD
WILLIAM R. MILLER
BY
Kenyon Kenyon
ATTORNEYS Aug. 28, 1962   J. W. REED ETAL   3,050,837
RAILROAD WHEEL MOUNTING PRESS
Filed Oct. 24, 1958   14 Sheets-Sheet 2
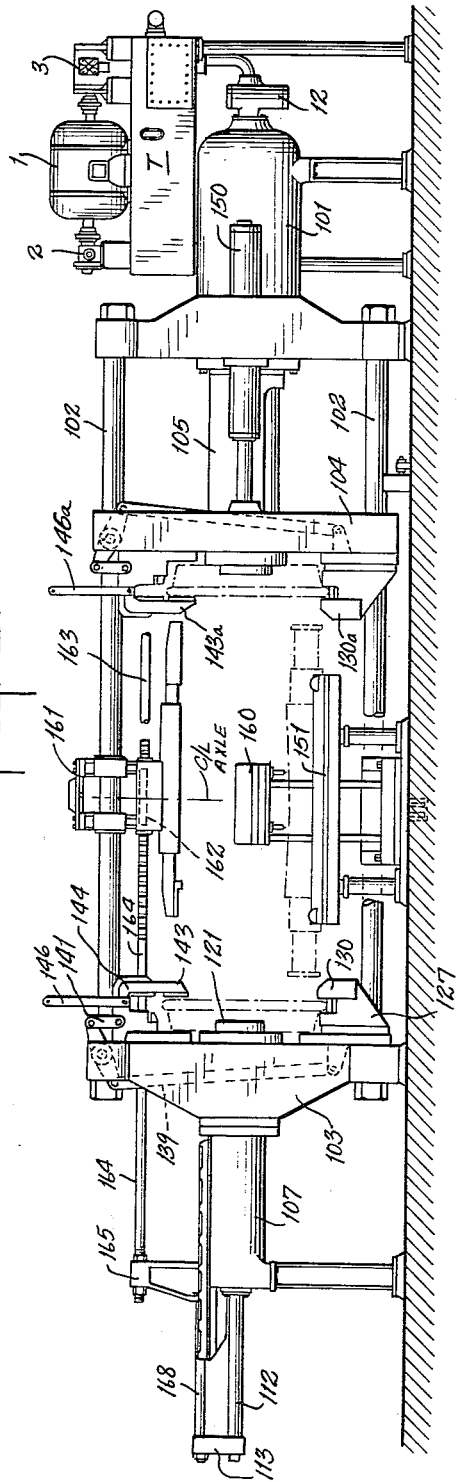
INVENTORS
JOHN W. REED
HENRY J. HALVORSEN
PETER HOLD
WILLIAM R. MILLER
BY
ATTORNEYS

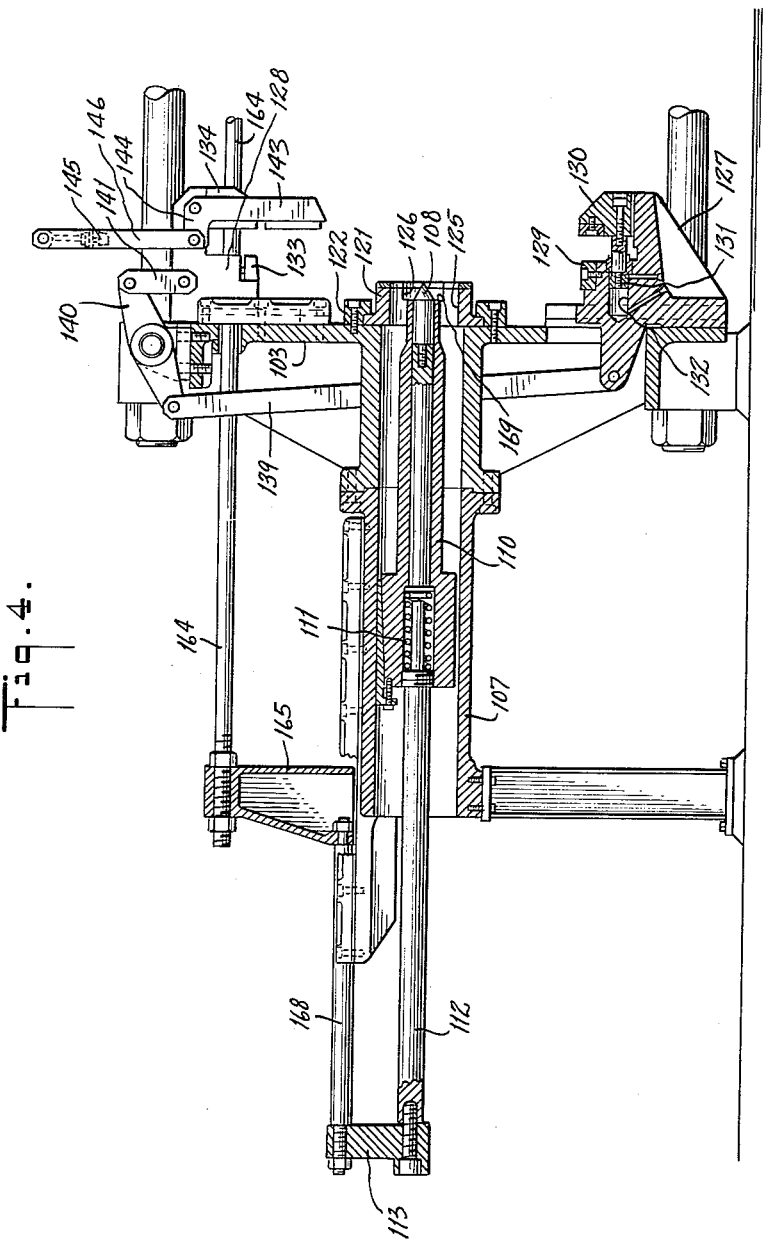

Aug. 28, 1962     J. W. REED ETAL     3,050,837
RAILROAD WHEEL MOUNTING PRESS
Filed Oct. 24, 1958     14 Sheets-Sheet 4

INVENTORS
JOHN W. REED
HENRY J. HALVORSEN
PETER HOLD
WILLIAM R. MILLER
BY
Kenyon & Kenyon
ATTORNEYS

Fig. 6.

Aug. 28, 1962  J. W. REED ETAL  3,050,837
RAILROAD WHEEL MOUNTING PRESS
Filed Oct. 24, 1958  14 Sheets-Sheet 9

INVENTORS
JOHN W. REED
HENRY J. HALVORSEN
PETER HOLD
WILLIAM R. MILLER
BY
Kenyon & Kenyon
ATTORNEYS

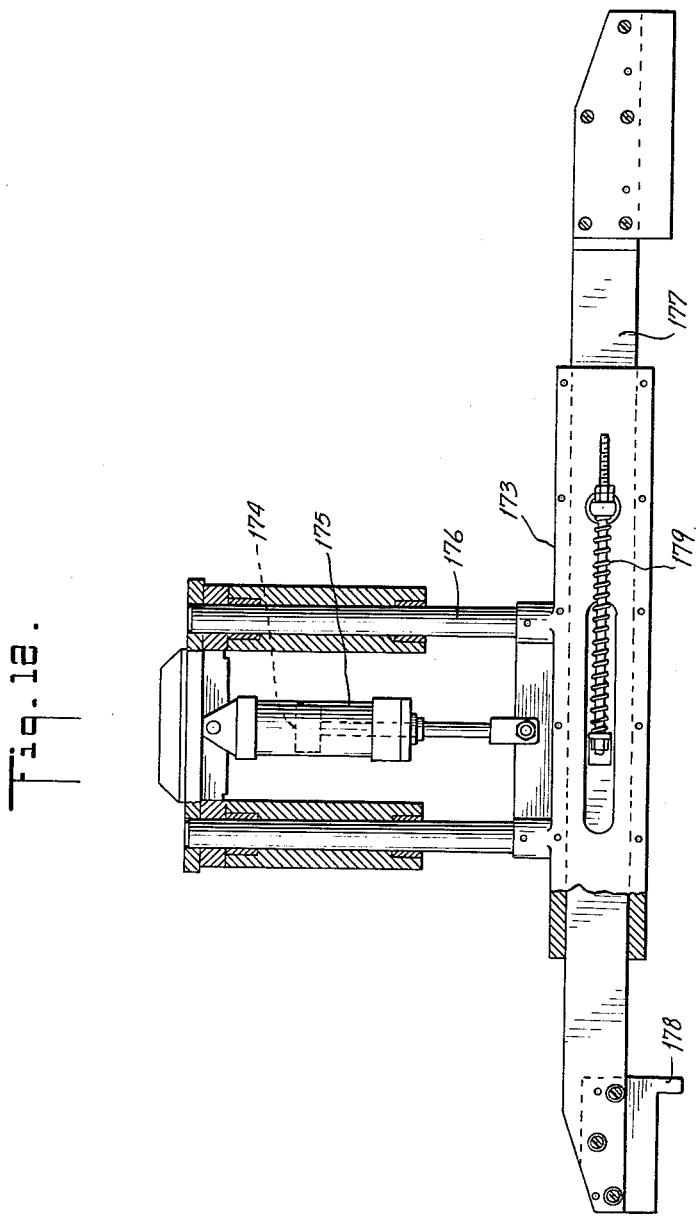

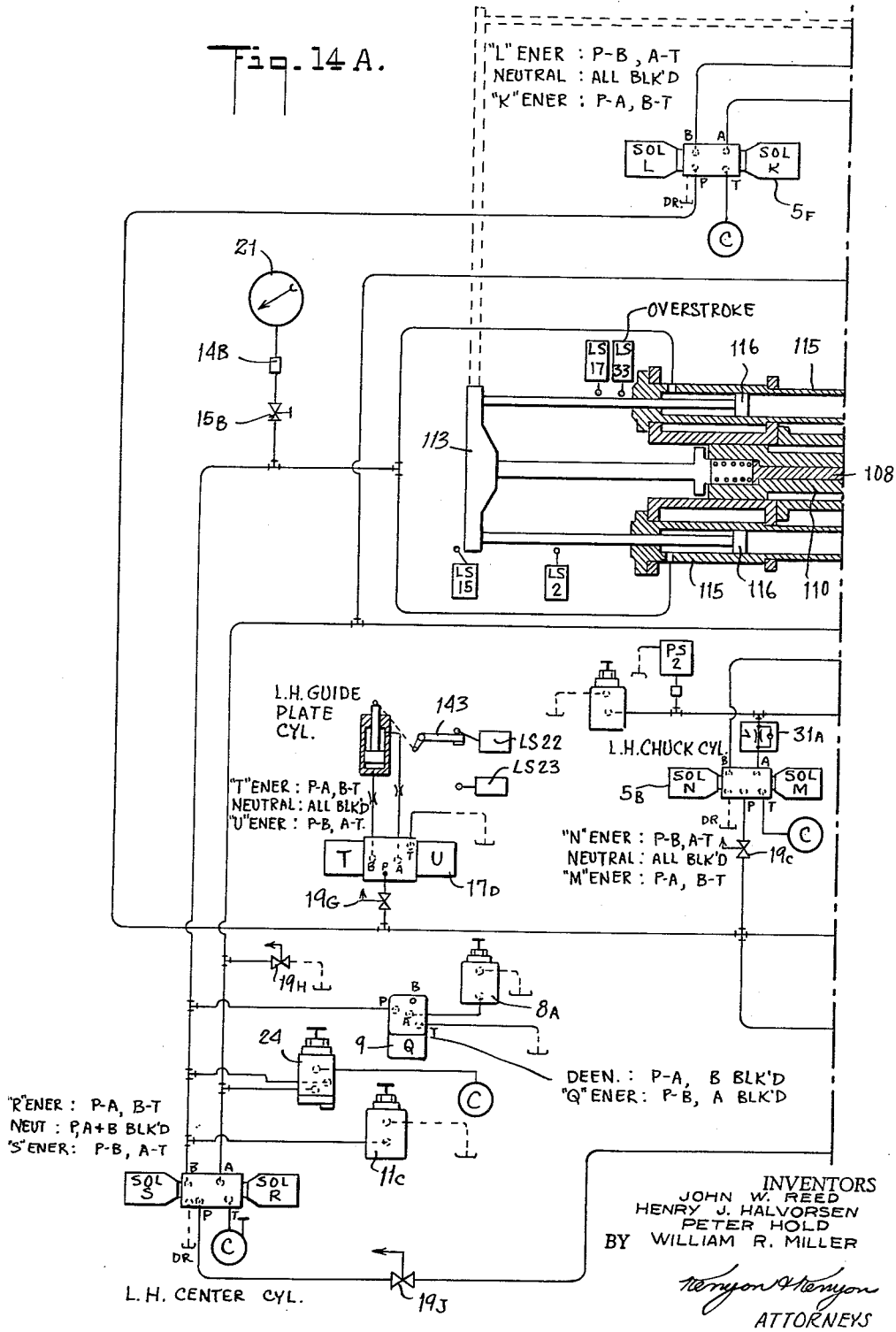

Aug. 28, 1962  J. W. REED ETAL  3,050,837
RAILROAD WHEEL MOUNTING PRESS
Filed Oct. 24, 1958  14 Sheets-Sheet 12
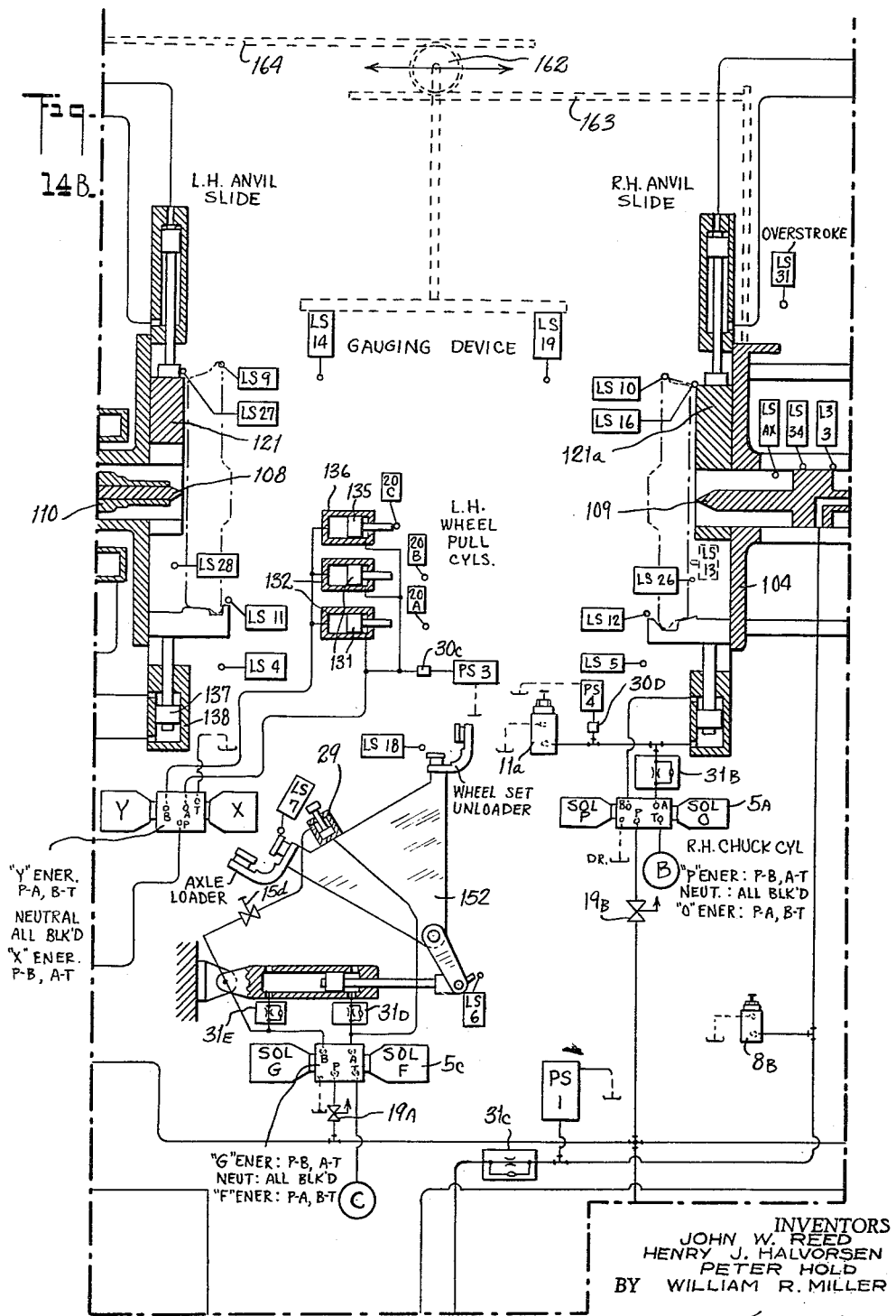
INVENTORS
JOHN W. REED
HENRY J. HALVORSEN
PETER HOLD
BY WILLIAM R. MILLER
Kenyon & Kenyon
ATTORNEYS

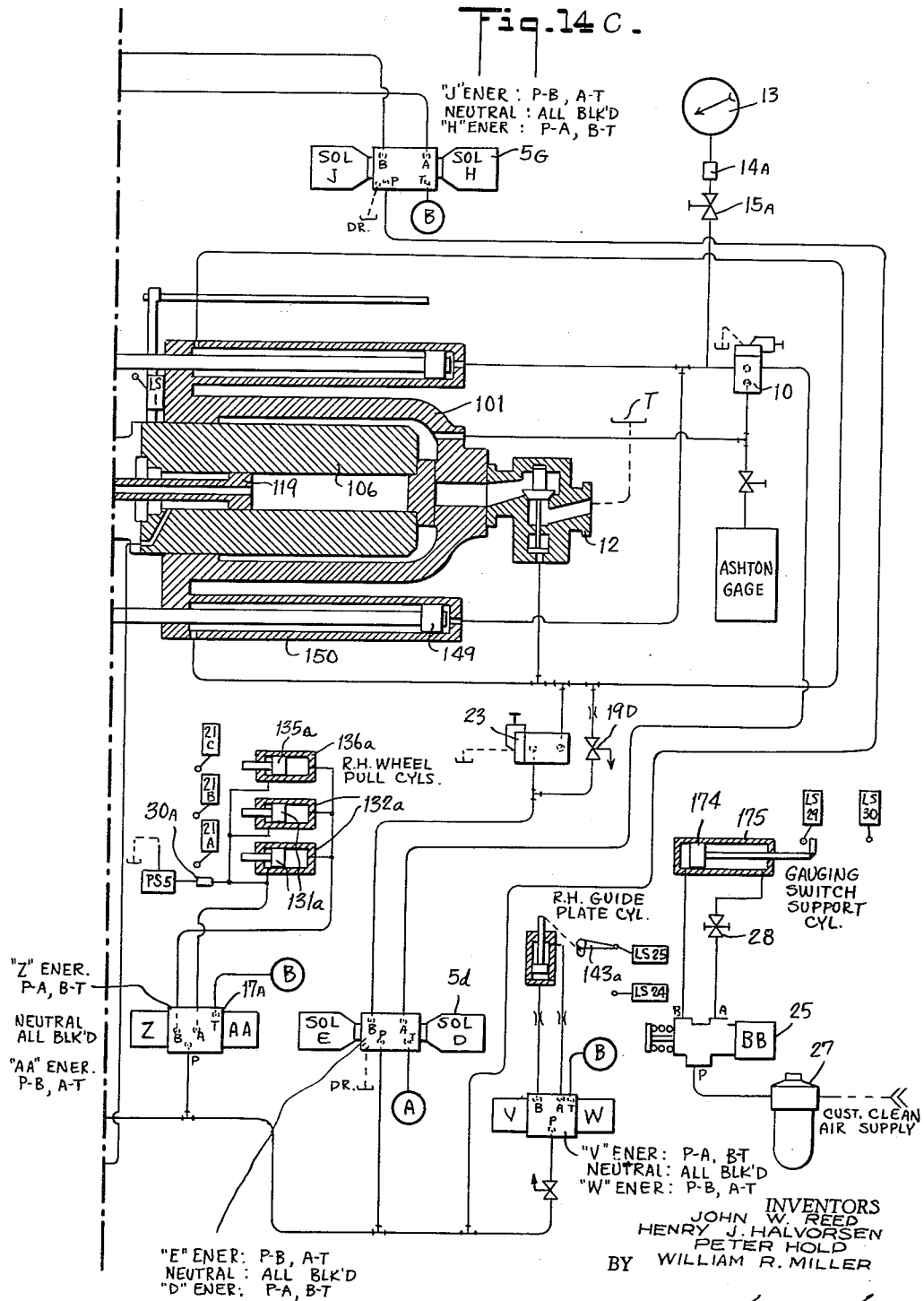

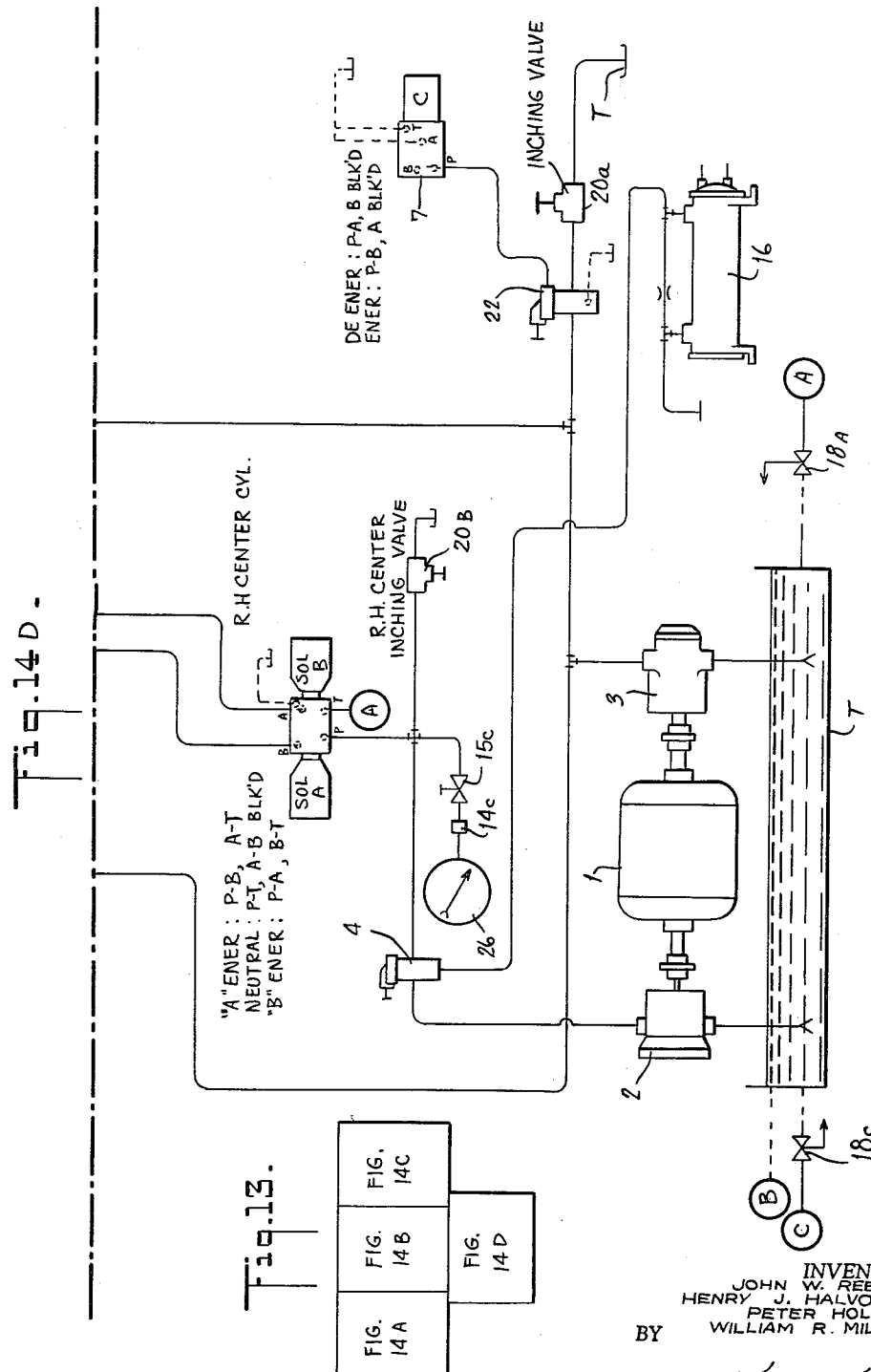

United States Patent Office 3,050,837
Patented Aug. 28, 1962

3,050,837
RAILROAD WHEEL MOUNTING PRESS
John W. Reed, Elizabeth, and Henry J. Halvorsen, Cranford, N.J., Peter Hold, Milford, Conn., and William R. Miller, Rochester, N.Y., assignors to Farrel-Birmingham Company, Inc., Ansonia, Conn., a corporation of Connecticut
Filed Oct. 24, 1958, Ser. No. 769,503
10 Claims. (Cl. 29—208)

This invention relates to a railroad wheel mounting press.

Railroads use wheel assemblies each comprising an axle having wheel seats on which railroad wheels are press fitted, and journals which project beyond the wheel seats and run in journal bearings when the wheel assembly is in service. The end faces of the axle has lathe center depressions which are concentric with respect to both the wheel seats and journals.

When the wheels become worn it is necessary to demount them from the axle. The axle may be reused and its journals and wheel seats are machined on a lathe with the lathe centers in the axle's end center depressions. This makes the seats and journals ready to receive new wheels whose hubs are correspondingly machined to fit the wheel seats, these wheels being press fitted on the wheel seats to provide an assembly ready to go back into railroad service.

One of the objects of the present invention is to provide a fully automated railroad wheel mounting press into which the wheels and axles may be successively rolled by suitable conveying equipment and which will mount the wheels on the axle in each instance without requiring any manual work. Another object is to provide such a press which works in a fully automatic manner without requiring manual control. Other objects may be inferred from the following disclosure of a specific example of an automated and automatically controlled railroad wheel mounting press embodying the principles of the present invention.

Referring to the accompanying drawings:

FIG. 2 is an elevation showing the side of the machine from which the mounted wheels and axle assembly exits from the machine;

FIG. 3 is an elevation view, partly in section, showing the wheels and axle assembly with the right-hand wheel having its hub bore aligned with the axle flange and passing thereover, the left-hand wheel being mounted;

FIG. 4 shows the left-hand portion of the machine as shown by FIG. 2 but in vertical cross section to illustrate the parts;

FIG. 5 is like FIG. 4 excepting that it shows the central portion of the machine;

Figure 6:
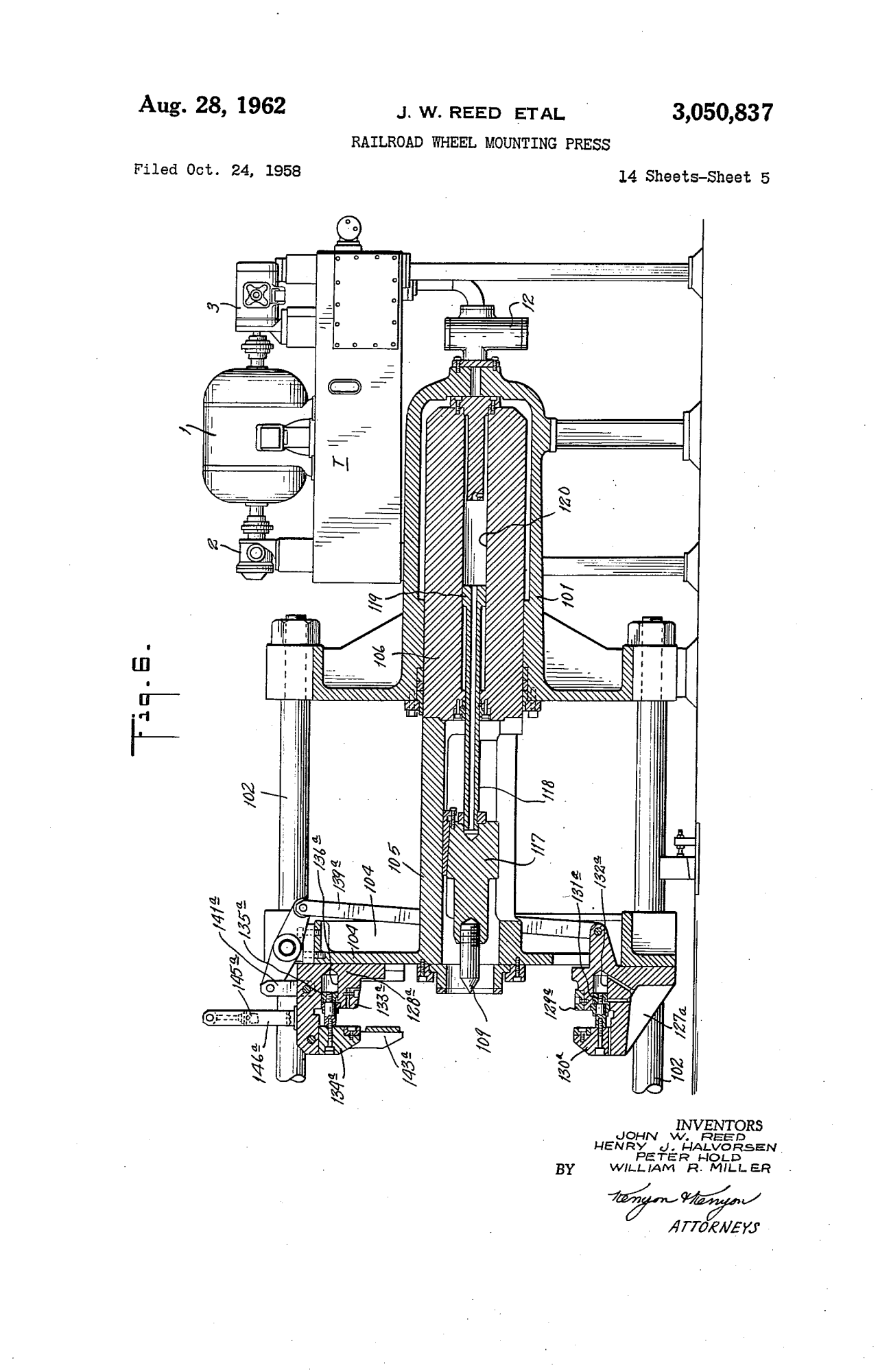

FIG. 6 is like FIGS. 4 and 5 excepting that it shows the right-hand portion of the machine;

FIG. 12 is a section taken from FIG. 10 on the diagonal line 12—12 in FIG. 10;

FIG. 13 is a pattern showing how FIGS. 14A through 14D may be arranged to provide a complete view; and FIGS. 14A through 14D schematically show the automatic control system which renders the machine fully automatic.

Figure 1:
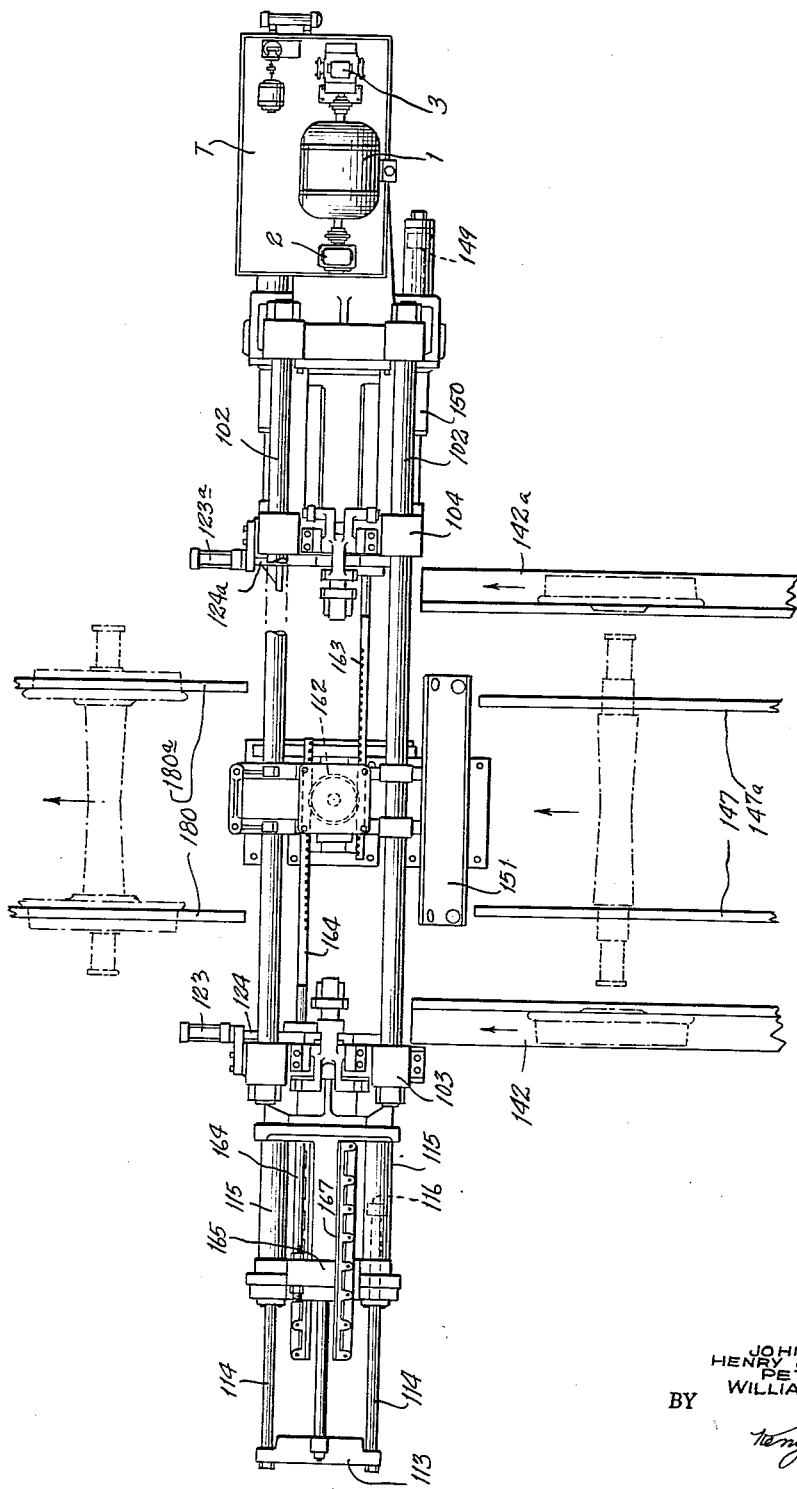
FIG. 1 is a top plan view of this specific example.
Figure 7:
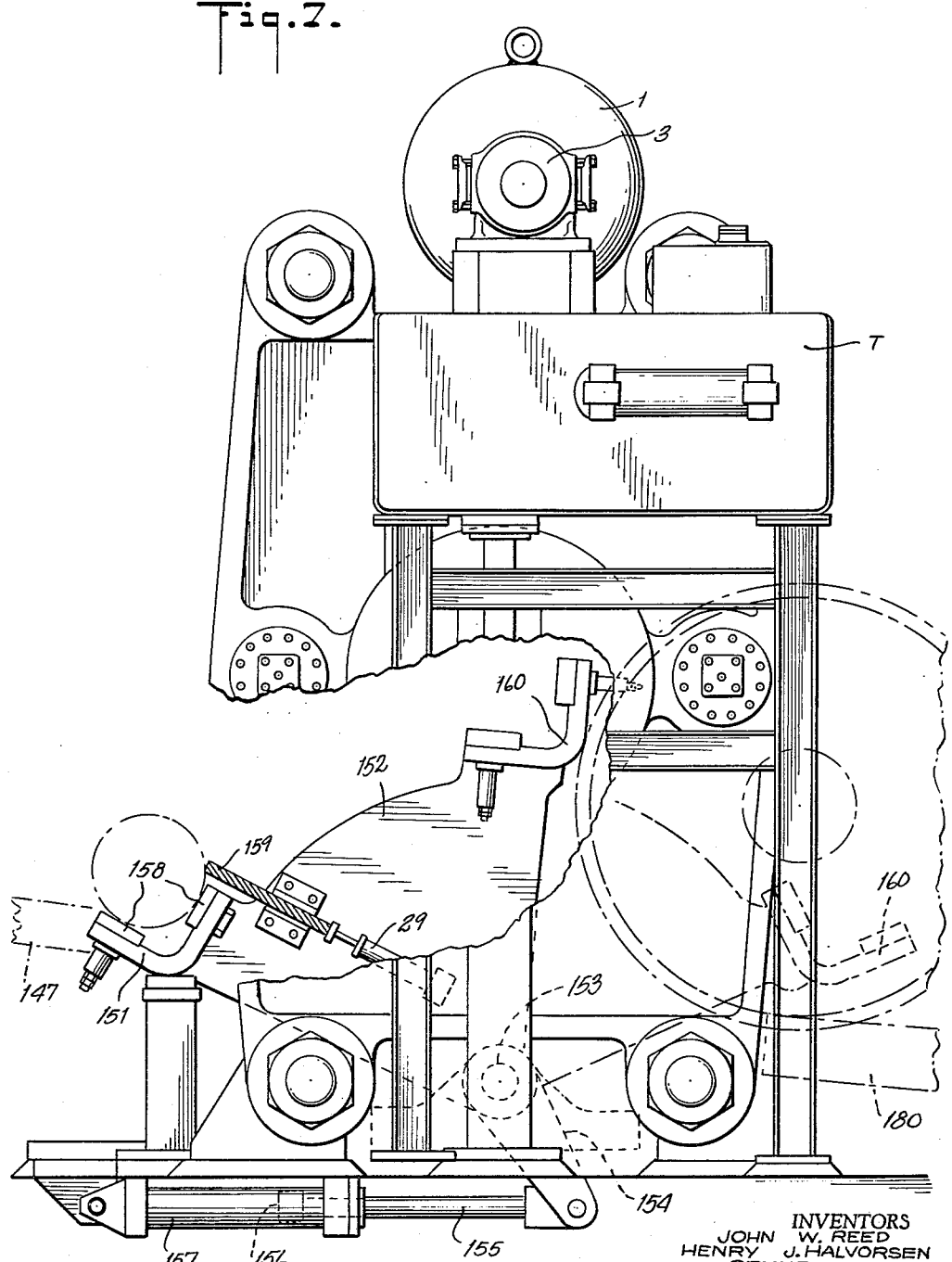
FIG. 7 shows in elevation the right-hand end of the machine shown by FIG. 2, with portions broken away to show elements located at the central portion of the machine.
Figure 8:
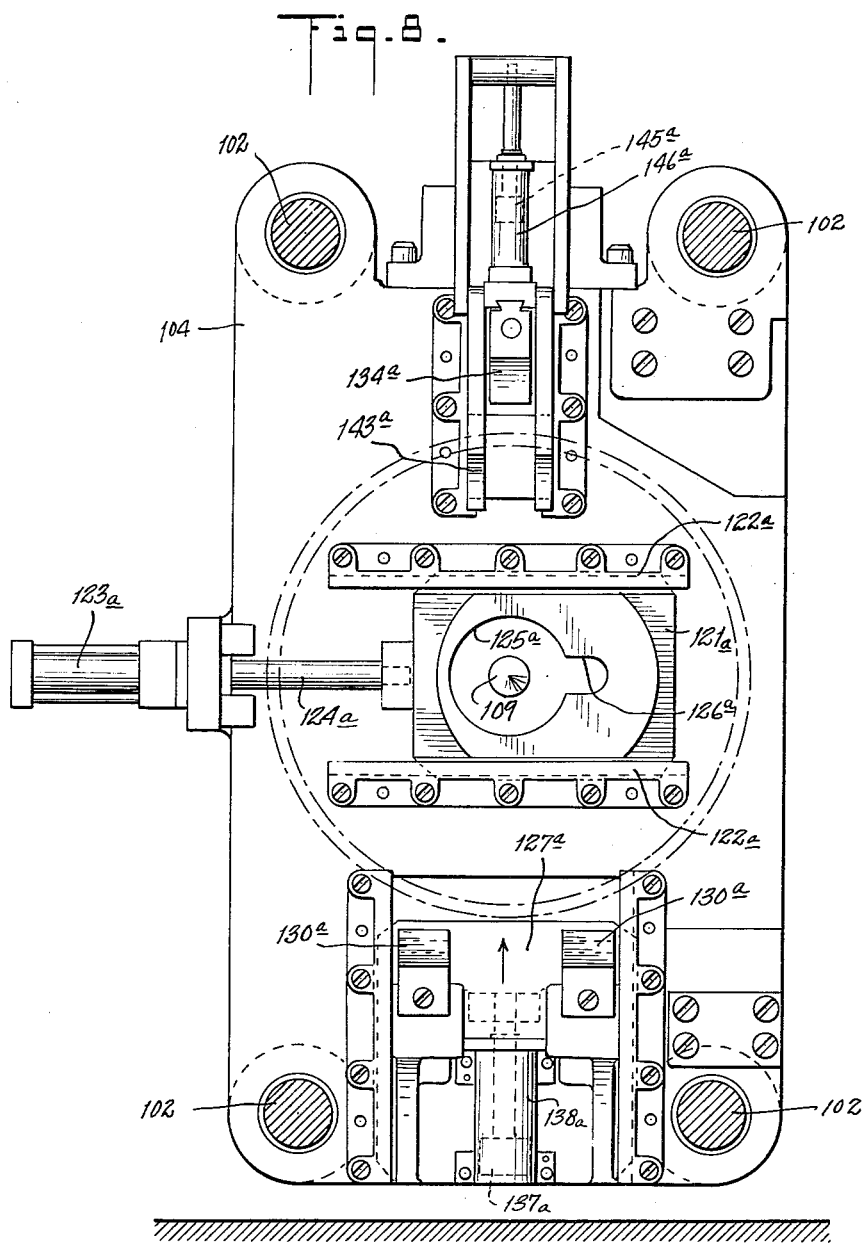
FIG. 8 is an elevation looking towards the right-hand portion of the machine as shown by FIG. 2 from a location near the central portion of the machine.
Figure 9:
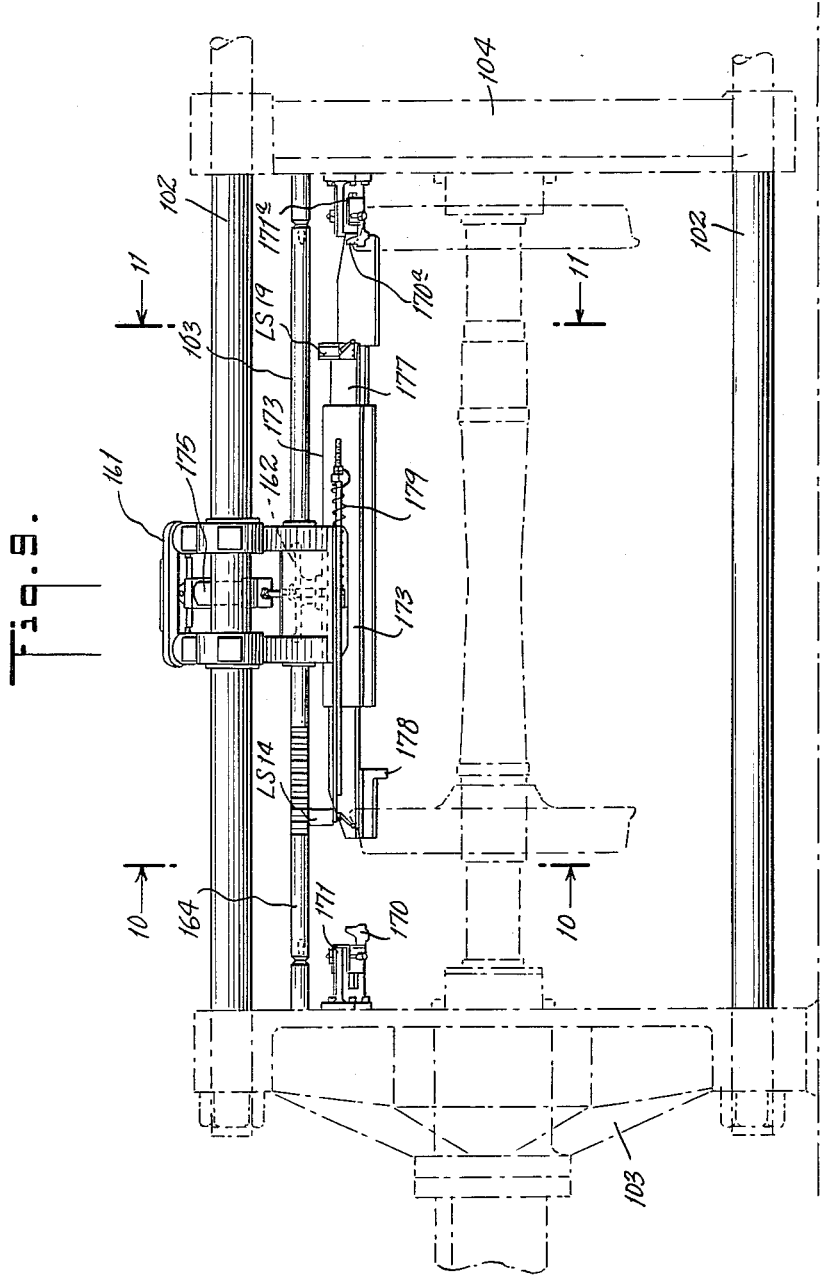
FIG. 9 shows certain details centrally located in FIG. 2 and is an elevation view.
Figure 10:
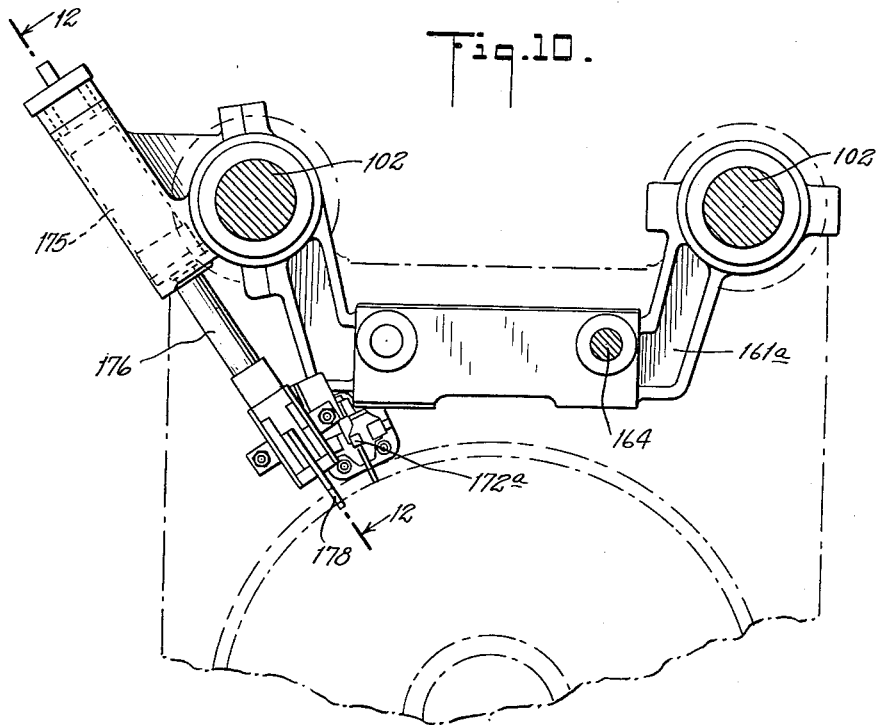
FIG. 10 is a vertical section taken on the line 10—10 in FIG. 9.
Figure 11:
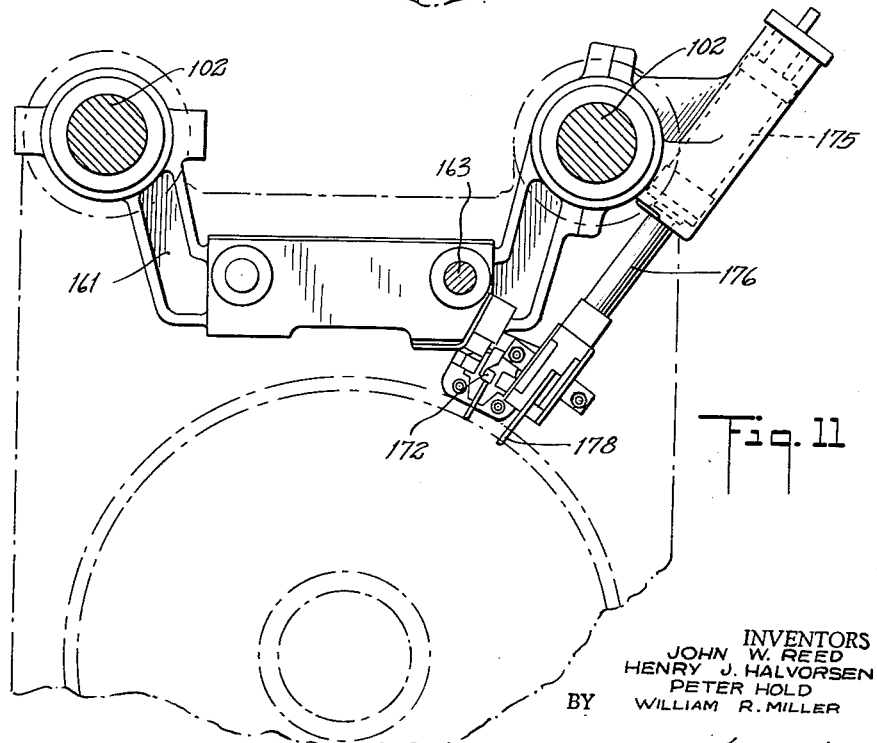
FIG. 11 is a vertical section taken on the line 11—11 in FIG. 9.

Referring to these drawings, a horizontal hydraulic cylinder 101 is connected by four mutually parallel rectangularly arranged tension bars 102 to a stationary vertical bed 103. A vertical platen 104 rides the bars 102 so as to be horizontally reciprocative, this platen 104 being connected by a horizontal connecting rod 105 with a hydraulic ram 106 reciprocating in the cylinder 101.

The bed 103 has an outwardly projecting horizontal guide 107 for horizontally reciprocatively guiding an axle center 108, and the connecting rod 105 is constructed to provide a generally corresponding guide for a horizontally reciprocative axle center 109. The two centers 108 and 109 have pointed ends for fitting the axle's lathe center depressions and these pointed ends reciprocate through the same horizontal path establishing the horizontal center line of the press which is symmetrical with respect to the four tension bars 102.

The center 108 is reciprocatively mounted within an axle end abutment carriage 110 which is the element guided by the guide 107, the center 108 being biased forwardly by a compression spring 111. The carriage 110 has a connecting rod 112 extending rearwardly and through a crosshead 113 connecting with horizontally interspaced connecting rods 114 which extend into hydraulic cylinders 115 for connection with double-acting pistons 116 reciprocating in these cylinders. Thus the center 108 may be reciprocating horizontally relative to the center 109.

The center 109 is rigidly mounted by a carriage 117 which is guided by the guide surfaces formed within the connecting rod 105. By a direct acting connecting rod 118 this carriage 117 is connected with a double-acting piston 119 reciprocating in a hydraulic cylinder 120 formed within the ram 106. Thus the center 109 may be reciprocated horizontally back and forth independently with respect to the platen 104 and the ram 106.

Both the bed 103 and platen 104 have horizontally shiftable abutments. This abutment 121 is guided horizontally by guides 122 and may be shifted back and forth by means of a double-acting hydraulic motor 123 of the piston and cylinder type, its piston connecting with the abutment by a connecting rod 124. Two horizontal interconnecting openings are formed through the abutment 121, one opening 125 being large enough for passage of the railroad axle and the other 126 being smaller so that the previously described center may project therethrough freely. The two openings comprise a keyhole shape and the abutment may be shifted to register either the portion 125 or the portion 126 with the axis established by the centers and regardless of whether or not a center is projected. The abutment 121 engages a wheel hub regardless of its position and an axle end only when shifted so that its opening 126 is registered with the center.

These abutments are duplicates, the abutment and its associated parts on the bed 103 being numbered as above while the corresponding parts on the platen 104 are similarly numbered and identified by the use of the letter a.

Both the bed 103 and platen 104 mount wheel chucks for chucking railroad wheels with their hubs pulled against the faces of the abutments 121 and 121a and with the hubs concentric with respect to the centers 108 and 109. These wheel chucks are substantial duplicates and are below given similar numerals with the parts on the platen 104 again being identified by the letter a.

Each chuck comprises a vertically reciprocative lower jaw carriage 127 and a vertically reciprocative upper carriage member 128, these carriage members respectively being mounted by the bed 103 and the reciprocative platen 104.

The lower jaw carriage 127 carries a pair of laterally spaced jaws 129 which are fixed relative to the carriage and horizontally reciprocative jaws 130. The latter are actuated by being connected with double-acting pistons 131 which ride in hydraulic cylinders 132.

The upper jaw carriages 128 provide single jaws comprising an inner fixed jaw 133 and an outer reciprocative jaw 134, the latter being actuated by a double-acting piston 135 riding in a hydraulic cylinder 136.

A double-acting piston 137 is connected to the lower jaw carriage 127 and rides in a hydraulic cylinder 138. This lower jaw carriage 127 is connected to the upper jaw carriage 128 by a link 139 which rocks a rocker arm 140 having opposite arms of equal lengths, and through this rocker arm and a connecting link 141 vertically reciprocating the upper carriage member. The interconnection is such that the upper and lower carriage members 127 and 128 respectively, always move concentrically or at equal distances from the center line established by the two centers 108 and 109. The rocker arm 140 is pivoted to the top of the bed 103 and the corresponding rocker arm 140a is pivoted to the top of the plate 104. Hydraulic fluid introduced to the fronts of the cylinders 132 and 136 forces the pistons 131 and 135 to move backwardly and pull a wheel placed between the jaw members against the abutment 121. Subsequent introduction of fluid to the bottom of the cylinder 138 forces the piston 137 upwardly so as to force the carriage member 127 upwardly and the carriage member 128 downwardly, the fixed jaw members 129 and 133 engaging the wheel rim and centering its hub with respect to the center 108. The corresponding action occurs at the platen 104 where the wheel hub is centered with respect to the center 109.

The wheels roll down chutes 142 and 142a to the respective chucks. Ordinarily the chutes will be provided with automatic releases (not shown) for releasing the wheels one at a time as they are needed. The wheels roll down between the jaws 129 and 130 where they are retained because here the jaw members are in the form of a horizontally interspaced set forming a saddle or a two-point support effect. At this time the wheel is prevented from toppling forwardly by a depending guide arm 143 in the form of a bell crank pivoted to the upper carriage 134 having a horizontal arm 144 actuated by being connected to a double-acting piston 145 which works in a hydraulic cylinder 146 mounted on top of the carriage member 128.

With a wheel resting between the jaw members 129 and 130 fluid may be introduced to the fronts of the cylinders 132 and 136 to pull the jaw members 130 and 134 lightly against the wheel while fluid is introduced to the cylinder 138 at its lower end so as to bring the jaw carriages close enough together for the jaw member 134 to engage the top of the wheel flange. This prevents the wheel from toppling forwardly and fluid may be introduced to the cylinder 146 as required to swing the arm 143 up out of the way and to a generally horizontal position. Thereafter more fluid may be introduced to the cylinder 132 and 136 to pull the wheel hub against the front face of the abutment 121 and more fluid introduced to the cylinder 138 to cause the fixed jaws 129 and 133 to engage the wheel rim and force the wheel to center concentrically with the center line established by the centers 108 and 109.

Throughout the foregoing it is to be understood that the same action occurs at both the bed 103 and the platen 104 and that where the parts are not shown at one location they are shown at the other correspondingly numeraled and identified as described before.

Now both wheels are chucked concentrically in each instance and are pulled against their respective abutments 121 and 121a. They are not pulled so tightly as to prevent the previously described shifting of these abutments but they are rigidly held against any radial shifting action.

The railroad axles are fed to the new press by inclined rails 147. When the ram 106 is at its fully retracted position and the wheels are chucked as described the spread of the press equipment is great enough to permit the axles to roll between the wheels. In other words the chucked railroad wheels may be moved apart farther than the axles are long to provide clearance for the latter.

Incidentally, the ram 106 being single acting forwardly, the platen 104 has horizontally interspaced connecting rods 148 which connect with double-acting pistons 149 reciprocating in long hydraulic cylinders 150. Admission of hydraulic fluid to the fronts of these cylinders 150 pulls back the platen 104 and admission of fluid to the backs of these cylinders 150 provides for a rapid platen advance, the cylinders 101 having a check valve 12 the action of which will described hereinafter. It is sufficient to say now that it permits rapid exhaust or pre-filling of hydraulic liquid in the cylinder 101 as required for the pull back or rapid advance of the platen 104 by actuation of the pistons 149 in the cylinders 150.

Returning now to the axles, the rails 147 are also preferably provided with means for releasing one axle at a time (not shown), this axle rolls down into the saddles 151 of a rocking axle loading and unloading device 152 keyed to a shaft 153 which in turn has a depending arm 154 keyed to it and connected to a connecting arm 155 which is actuated by a double-acting piston 156 working in a hydraulic cylinder 157 arranged horizontally slightly below floor level.

When fluid is admitted to the back of the cylinder 157 its piston 156 pushes the connecting rod 155 forwardly so that the saddle 151 is rocked to a position to receive an axle released so as to roll down the rails 147. This saddle is long enough to mount axle wheel seat engaging members 158 located to register with the wheel seats of the axle rolled into the saddle. This has the advantage that since the wheel seats are machined surfaces the parts 158 can position the axle in a predetermined manner relative to its lathe center depressions. Thus positioned the loader 152 is rocked forwardly by appropriate hydraulic power of its actuating piston 156. The arrangement is such that the axle is brought into a position with its axis very slightly below the horizontal center line established by the centers 108 and 109. The action is rapid and the saddle 151 is provided with a latch 159 for preventing the axle from being thrown out of the saddle 151. This latch 159 is operated by a piston and cylinder actuator connected to the rocking loader and of which its cylinder is indicated at 29. This latch 159 is extended when the loader moves forwardly so that it can perform its function and is then retracted so that in due time the loader can be returned to its starting position.

With the axle by the loader as described, hydraulic liquid is admitted to the back ends of the cylinders 115 and 120 so that the centers 108 and 109 advance, enter the top portions of the conical lathe center recesses and continue inwardly so as to by cam action lift the axle from the parts 158 and hold the axle automatically centered in the press. It is at this time that the latch 159 is retracted and the loader 152 rocked back to its starting position. This loader has a second relatively short saddle 160 into which the axle may be dropped by retracting the centers 108 and 109. This is done after the wheels are mounted. It is explained at this point to show that each time the loader rocks it unloads an axle with wheels mounted on it while loading a fresh axle into the machine.

With the wheels chucked as previously described it is to be noted that the axle is picked up by the centers 108 and 109 reaching through the hubs of the chuck wheels so as to engage the axle. At this time the wheels are spaced far enough apart to permit the axle to be moved backwardly and forwardly by appropriate action of the centers 108 and 109. Pressure is maintained at the backs of the cylinders 115 and 120 at all times so that there is no danger of the centers releasing from the axle. By applying more liquid pressure to either the cylinders 115 or 120 it is possible to shuffle the axle back and forth as desired for its manipulation.

With both the wheels and the axle loaded the normal operation now practiced is to move the abutment 121a to bring its smaller opening 126 around the center 109. Then a greater fluid pressure is introduced to the backs of the cylinders 115 so as to push the axle towards the abutment 121a through the wheel hub and into engagement solidly with the face of this abutment. This is done to in effect set up an automatic axle center locating and wheel tread gaging arrangement which is now described below.

A carriage 161 is reciprocatively mounted on the upper two of the tension bars 102. This carriage on a vertical axis mounts a gear wheel 162. This gear wheel is engaged on one side by a horizontal rack 163 extending forwardly from and connecting to the moving platen 104. On its other side it is engaged by a corresponding rack 164 which extends in the opposite direction and is connected to an arm 165 projecting upwardly from a supporting carriage 166 which rides in a horizontal guideway 167 mounted above and connecting with a connecting rod 168 which connects with the crosshead 113.

Now when the center 108 pushes on the axle to shift the latter's other end against the face of the abutment 121a, this center 108 retracts enough so that the forward end 169 of the member 120 abuts solidly against that end of the axle. The lathe center depressions are drilled to differing depths but with the arrangement described the mounting 110 for the center 108 engages solidly the end of the axle itself. Therefore, as the axle is shifted against the abutment 121a the rack 164 advances and rolls the gear wheel 162 between it and the rack 163 which is connected to the platen 104. This causes vertical center line of the carriage 161 to coincide with the middle or center of the axle when the latter's advancing end, pushing back the center 109, engages the abutment 121a. In effect the axle center is thus located and captured or retained by the carriage 161 during subsequent shifting of the axle.

Next the abutment 121 is shifted by means of its hydraulic motor 123 so as to bring the large opening 125 into alignment with the axle end. Now fluid is admitted to the back ends of the cylinders 150 to quickly advance the platen 104 to bring the wheel seat of the axle into the hub of the wheel chucked to the bed 103. The outer side of the hub is backed up solidly by the abutment 121. At this time hydraulic pressure is applied to the rear of the ram 106 in the cylinder 101 so as to press the axle through the wheel on the bed 103.

Both the bed 103 and the platen 104 mount a wheel gage 170 at a location where it is pressed against the rim and flange of the wheel. This gage can slide both up and down and horizontally in line with the wheel axis, this being effected by a suitable mounting 171 fastened to the bed 103. The same arrangement is fastened to the platen 104 and again the numerals correspond with the letter a providing identification. These gages are contoured so that when they are engaged by the wheel their inner surfaces provide a means for measuring the distance of the wheel from the axle's center. This in turn provides a measure of the tread gage.

A limit switch LS14 mounted fixedly to the carriage 161 so as to depend and engage the inner face of the gage 170, which is pressed tightly against the wheel rim and flange, when the axle is pressed through the hub bore of the wheel chucked to the bed 103, the proper distance relative to the center of the axle.

With this one wheel mounted it can be unchucked from the bed 103 by releasing the jaws 130 and retracting the jaw carriages 127 and 128, the guide arm 143 having already been thrown out of the way. The ram 106 is retracted by operation of the pull backs formed by the parts 149 and 150, the abutment 121a is shifted by its motor 123a to bring its large opening 125 into registration with the axle, and the abutment 121 is shifted by its motor 123 to now bring its small opening 126 into play.

With the end of the axle having the mounted wheel now backed up solidly by the abutment 121 the ram 106 may be advanced with its abutment 121a clearing the axle end but with its face engaging the outer face of the hub of the still unmounted wheel still chucked to the platen 104. The previously described rapid advance followed by the slower pressing advance may again be used to operate the platen 104. In this way the unmounted wheel is pressed on its axle seat.

Now as the platen 104 advances its rack 163 causes the wheel 162 to roll the carriage 161 along at half the travelling speed of the platen 104. However, this is not the center of the axle any more, as with the shifting of abutment 121a, and the entering of the right-hand end of the axle into the large opening of this abutment, the center is lost.

This carriage mounts a downwardly projectable and retractible wheel tread gaging system comprising a horizontal guide 173 actuated up and down by being connected to a double-acting piston 174 working in a vertical cylinder 175 and with this guide 173 guided in its up and down motion by guiding bars 176.

The guide 173 mounts a horizontally reciprocative bar 177 having on its end most adjacent to the bed 103 a depending gaging finger 178 which engages the inside of the flange of the first mounted wheel. This bar is biased in that direction by a spring 179. Prior to the axle and the first mounted wheel being shifted towards the platen 104 fluid pressure is applied to the upper end of the cylinder 175 to push down the guide 173 and position the finger 178 so that as the mounted wheel is pushed toward the platen 104 its flange engages the finger 178 and pushes the bar 177 towards the platen 104 until the axle end where the first wheel is mounted clears the abutment 125 to permit the previously described shifting of this abutment. The opposite end of the bar 177 mounts a limit switch LS19. This latter limit switch is positioned so that when the gage finger 178 engages the inside of the first mounted wheel this limit switch LS19 is operated by the gage 171a when the platen 104 moves to a position where its abutment 121a has driven the second wheel on its seat to provide the proper tread gage.

The first limit switch LS14 when operated serves to stop further press mounting of the first wheel and operation of the limit switch LS19 serves to stop further pressing of the second wheel. The manner in which this is done is explained hereinafter. The carriage 161 remains at the center of the axle during first wheel pressing operations only, and provides for pressing the first wheel to a predetermined position relative to the center of the axle, and for pressing the second wheel to a predetermined position relative to the first wheel and also for measuring the actual resulting tread gage. These measuring operations are required by current specifications for railroad wheel mounting operations.

With both wheels mounted both centers 108 and 109 can be retracted. The unloading saddle 160 is located so that the released axle with its mounted wheels drops into this saddle. Then the rocking loader 152 is again rocked so that this finished wheel set is deposited on runout railroad rails 180 whereupon they roll away from the machine by gravity. At the same time an axle previously loaded in the saddle 151 is brought into position so that as soon as another set of wheels are rolled into the chucks of the machine it may be engaged by the centers 108 and 109 and lifted clear from the wheel seat engaging parts 158 so that the unloader may return to its starting position.

The automatic control system is illustrated without showing the electrical wiring relays and the like since these may be installed by any electrician. The hydraulic pipe lines are not numbered since here again only hydraulic plumbing is involved. Only the essential elements are illustrated and numbered. The elements and their operation are described simultaneously.

With the above in mind, assume that the motor 1 is running and driving the hydraulic pumps 2 and 3. All of the solenoids of all of the illustrated solenoid actuated valves are deenergized and the pump 2 is bypassing through the valve 6 by way of its ports A to B to the tank T containing the surplus hydraulic liquid reserve. Part of the oil from the pump 2 passes through the cooler or heat exchanger 16. The pump 3 is bypassing through the vented relief valve 22 to the tank T.

The ram 106 is back against the LS1 and the piston 119 is back against LS3. The pistons 116 are back so that the crosshead 113 is against LS15. The abutment 121a is back against LS26 and the abutment 121 is back against LS28. The wheel guide 143a is back against LS24 and the corresponding guide 143 is back against LS23. The pistons 131a and 135a are forward so as to operate LS21A and 21B and 21C and the corresponding pistons 131 and 135 are forward so that LS20A, 20B and 20C are operated. Both chucks are fully opened to operate LS5 and LS4 respectively and the rocking axle loader 152 is down at its starting position so as to operate LS6. The piston 174 is up so that the gaging bar 177 and its supporting parts are against LS29.

With the above conditions the automatic cycle is as follows.

Limit switches LS1, 3, 5, 16, 21A, 21B, 21C, 24 and 29 in series give the signal to release the wheel which is to roll down the chute 142a. When this machine rolls into the lower jaw member 127a it bumps against a mechanical stop to prevent it from overrunning and it operates LS10.

With LS10 operated solenoids C and O are energized and valve 7 closes so as to devent valve 22 and valve 5A shifts to pass the hydraulic fluid, which is oil, through ports P to A. Now the pistons 131a and 135a pull back enough to operate LS12 which is located so that the jaws 130a and 134a are not quite gripping the wheel.

When LS12 is thus operated solenoids Z and V are energized thus shifting valve 17A to connect its ports P to A, thus causing the pistons 131a and 135a to pull the wheel tightly against the abutment 121a. Then valve 17B shifts to connect its ports P to A and the wheel guide 143a moves upwardly away from the wheel and operates LS25. As pressure builds up in the cylinders 132a and 136a, as the jaws 130a and 134a close tightly the pressure switches PS4 and PS5 are operated.

Now the wheel is held tightly against the abutment 121a and is centered because the valve 5A has caused the piston 137a to be pushed upwardly. This is the right-hand wheel as the drawings are viewed.

As to the left-hand wheel, limit switches LS4, 15, 20A, 20B, 20C, 23, 28 and 29 in series give the signal to release that wheel so that it rolls down the chute 142 and into the lower jaw member 127 where it is stopped mechanically by an abutment to prevent it from overrunning and where it operates LS9.

Operation of LS9 energizes the solenoids C and M and valve 7 closes, deventing valve 22, while valve 5B shifts to pass oil through ports P to A. The pistons 131 and 135 now pull back so that the jaws 130 and 134 partly close so as to not quite grip the wheel while operating LS11.

LS11 energizes solenoids Y and T, and valve 17C shifts to connect its ports P to A so that the jaws 130 and 134 pull the wheel tightly against the abutment 121. The valve 17D shifs to connect its ports P to A so the left-hand wheel guide 143 swings upwardly and away from the wheel when it operates LS22. As the wheel jaws close tightly pressure builds up so that pressure switches PS2 and 3 are operated.

The rocking axle loader 132 being in its down position operates LS6 which gives the signal to release an axle so that it can roll down the rails 147 and into the saddle 151 where it operates LS7.

When LS7 is operated by the axle in the loader solenoids C and F are energized, valve 7 closes, deventing valve 22, while valve 5C shifts to connect its ports P to A. This causes the axle loader to move up to position the axle between the centers 108 and 109 where it operates LS8. The shifting of the valve 5C also sends hydraulic fluid to the cylinder 29 extending the latch 159 so that it prevents the axle from being thrown forwardly out of the saddle 151.

Incidentally, the above axle loading operation is timed to occur prior to the wheel chucking operations.

The press operating cycle proper starts upon completion of interlocking of LS7, 8, 9, 10, 22, 25, 26, 28, 3, 15, and pressure switches PS2, 3, 4 and 5.

With solenoids B and S energized the valve 6 shifts to connect its ports A to P and the center 109 advances under the power of the pump 2. The valve 5E shifts to connect its ports P to B and the center 108 advances under the power of the pump 3. Thus both centers advance to engage the ends of the axle and as pressure builds up they lift the axle off of the surface 158 of the axle loading saddle 151. The pressures exerted on the two centers are approximately equal so the centers stall against each other holding the axle stationary.

This causes PS1 to operate and LS18 and 17 are released and solenoid F is de-energized and solenoid G is energized. The valve 5C shifts to connect its ports P to B and the axle loader drops and operates LS6. The cylinder 29 is operated to retract the latch 159 at this time.

LS6 operated by the loader returning to its loading position, solenoid Q is energized and valve 9 closes, making the relief valve 8A inactive. Now the pressure in the cylinders 115 and 116 rises to overpower the force exerted by the piston 119 so the axle centers move towards the platen 104 so that LS—XA is hit and de-energizes solenoid Q. This also energizes solenoid H to connect its ports P to A shifting the abutment 121a so that it is free from the axle end. The abutment hits LS16 re-energizing solenoid Q.

LS13 is operated by the shifting of the abutment and it energizes solenoid D so that valve 5D shifts to connect its ports P to A. This sends oil to the backs of the cylinders 150 so as to overpower the force exerted by the pistons 116, the axle now being pushed to the left between the two centers through the wheel hubs until the axle's wheel seat enters the wheel chucked to the bed 103. Then pressure builds up to the setting of the sequence of valve 10, the cylinder 101 prefilling through the check valve 12. Solenoids Q and S being deenergized the valve 5E spring centers and blocks all ports. The valve 9 opens. Pressure in the cylinders 115 drops to the setting of the valve 8A, oil being pushed out of this valve. LS35 is operated after about two inches of stroke de-energizing solenoids M and Y. Sequence valve 10 now opens to connect the cylinders 150 with the cylinder 101 and the ram 106 then slows to the wheel pressing speed, the check or prefilling valve 12 closing.

At this time the necessary Ashton recording gage starts its check.

When the gaging limit switch LS14 is operated solenoid D is de-energized and solenoids N, S and X are energized. The valve 5D now spring returns to neutral, stopping further advance of the ram 106. The valve 5B shifts to pass oil from ports P to B and the chuck elements on the bed 103 now open to release the wheel just mounted and operating LS4. The valve 17C shifts to connect its ports P to B and fluid is introduced to the fronts of the cylinders 150 to pull back the ram 106, this operating limit switches LS20A, 20B and 20C. The valve 5C shifts to connect ports P to B, holding pressure on the cylinders 115. Operation of LS4 de-energizes solenoid N, the valve 5B spring centering and blocking all its ports, LS20A, 20B and 20C in parallel de-energize solenoid X and valve 17C spring centers blocking port P. The valve 5D shifts to connect ports P to B and the ram 106 now returns. The sequence valve 26 holds back pressure in the system to assure that the center 108 follows up to prevent dropping of the axle. The valve 9 closes and allows pressure to build up in the cylinders 115, the back pressure of oil in the backs of the cylinders 150 opening the prefill valve 12 to dump oil from the cylinder 101 into the tank. This return operates LS2.

With LS2 operated solenoid S is de-energized and valve 5E spring centers and the center 108 stops. Pressure is still held on the backs of the piston 119 by the valve 6. The platen 104 can still move back to relieve pressure on the abutment 121a. Rearward motion of the platen 104 operates LS34 and solenoids E and Q are de-energized, the valve 5D spring centering and blocking all its ports so that the ram 106 stops. Solenoids J and K are energized and valve 5G shifts to connect its ports P to B, the abutment 121a then moving in to operate LS26. Valve 5F shifts to connect the ports P to A and the abutment 121 moves out to operate LS27. Solenoid Q is de-energized and the pressure on the center 169 drops to the setting of the valve 8A. Solenoid BB is energized and the gaging device drops to operate LS30.

Limit switches 26, 27 and 30 in series are operated. Solenoid D is energized and valve 5D shifts to connect ports P to A, the ram 106 now starting forwardly, overpowering the pistons 116 and pushing the axle end against the face of the abutment 121. This stops the axle and the ram 106 continues to push the wheel up to the axle wheel seat. Oil trapped in the cylinder 120 is pushed out through the relief valve 4. LS26 de-energizes solenoid J and LS27 de-energizes solenoid K.

Sequence valve 10 again opens connecting the cylinders 150 with the cylinder 101, the ram 106 slowing down to its pressing speed and the wheel being mounted on the axle wheel seat until LS19 is operated. LS36 is operated after about two inches of stroke and de-energizes solenoids O and Z.

As the wheel is mounted to gage LS19 is operated. Solenoid D is de-energized and valve 5D spring centers. This stops further motion of the ram 106. Solenoids P and AA are energized and valve 5A shifts to connect ports P to B. Now the chucks on the platen 104 open to operate LS5, valve 17A shifts to connect ports P to B and the pistons 131a and 135a release so that LS21A, 21G and 21C are operated.

LS5 de-energizes solenoid P and valve 5A spring centers to block all ports. LS21A, 21B and 21C in parallel de-energize solenoid AA. Valve 17A spring centers to block port P.

LS5, 21A, 21B and 21C all in series energize solenoids E, S and Q. Valve 5D shifts to connect the ports P to B and valve 9 closes to allow pressure to build up in the cylinders 115. The large ram 106 moves back, the prefill valve 12 opens and valve 5E shifts to connect ports P to B. Now the pistons 116 drive the center 108 towards the platen 104 following the motion of the ram 106 until LS2 is operated.

With LS2 operated solenoids E and S are de-energized and the valve 5D spring centers blocking all ports and stopping the ram 106. Valve 5E spring centers stopping the motion of the pistons 116. Valve 5F shifts as solenoid L is energized to connect ports P to B and the abutment 121 moves in so LS28 is operated and solenoid BB is de-energized. The gaging bar 177 rises with its associated equipment so as to operate LS29.

The limit switch LS28 is operated by the inward motion of the abutment 121 and LS29 is in series with it. Solenoids L now de-energize and valve 5F spring centers blocking all ports. Solenoids E and S are energized and valve 5D shifts to connect its ports P to B. The main ram 106 again starts backwardly with the pistons 116 following it pushing the axle to the right until LS17 is operated.

Solenoids S and Q are de-energized by LS17 and valve 9 opens, the pressure on the pistons 116 dropping to the setting of the valve 8A. Valve 5E spring centers blocking all ports and the axle stops moving to the right as to the pressures against the pistons 116 and 119 substantially balance. The main ram 106 continues backwardly until it operates LS1.

With LS1 operated solenoids E and G are de-energized, and valve 5D spring centers blocking all ports. Solenoid B is de-energized and solenoids A and R are energized. The valve 6 shifts to connect its ports A to B and the center 109 retracts to operate LS3. The valve 5E shifts to connect ports P to A and the center 108 retracts and operates LS15. Now the axle drops into the saddle 160 and operates LS18.

LS15 de-energizes the solenoid R and valve 5E spring centers, blocking all ports. LS3 de-energizes solenoid A, valve 6 spring centering and blocking port P.

With solenoid F energized valve 5C shifts to connect ports P to A and the axle loading device rocks upwardly to bring in a new axle and remove the assembled set from the machine, LS8 is operated.

With LS8 operated solenoids T and V are de-energized, solenoids U and W are energized, and valves 17B and 17D shift. Now the guide arms 143 and 143a swing down and operate LS23 and LS24. The former de-energizes solenoid U and the latter de-energizes solenoid W. Now the system is set up for another cycle.

In the foregoing description of the system the locations of the various limit switches as indicated by the schematic drawings of the system show their operation where it is not described in detail above. The limit switches, solenoid actuated valves and the like are all of the type commonly used to control automatic and hydraulic equipment.

We claim:

1. A press for manipulating a railroad axle having end lathe centers and wheel seats, and two railroad wheels having hubs with wheel seat bores for press fitting on said seats; said press including means for holding said wheels upright with their bores axially aligned on a horizontal center line and spaced apart more widely than the length of said axle and with one wheel reciprocatively movable towards the other, two axle centers having forward ends with points and diameters smaller than those of said bores and freely insertable through the latter, means for mounting said centers axially aligned with said center line and their points pointing towards each other and spaced apart more widely than the outsides of the hubs of said held wheels and reciprocative inwardly by passing through said hubs' bores, and means for moving said centers inwardly so their points enter said recesses of said axle and apply pressure to the latter when the latter is located in axial alignment with said center line and for thereafter while releasable maintaining said pressure to hold said axle reciprocating said centers simultaneously and in phase to shuffle said axle relative to one or the other of said wheels.

2. The press of claim 1 and including a rocker rocking transversely below said center line between said held wheels and having a transverse saddle means for supporting said axle, said saddle means being located so that when said axle is supported by said saddle means and said rocker is rocked to an aligning position where the axle is parallel with said center line the axles' said recesses are located slightly below alignment with said center line so that when said centers' points enter said recesses they wedge said axle upwardly and lift it into said alignment and free from said saddle means to permit rocking of said rocker away from the axle.

3. The press of claim 2 in which said saddle means is contoured to support said axle when said rocker rocks from a saddle means loading position offset in one direction free from said aligning position and to the latter, and said rocker means has a second saddle means to support said axle when at said aligning position and said rocker rocks therefrom to a saddle means unloading position offset in the opposite direction from said loading position.

4. The press of claim 1 and including adjacent to each of said wheels held by said wheel holding means, releasable means for abutting the outside of the hub of said wheel held thereby and releasable means for abutting the adjacent end of said axle held between said centers, in each instance said abutting means being immovable in the direction of said center line relative to the wheel held by said holding means adjacent thereto, and means for reciprocating both said hub and axle end abutment means adjacent to the movable wheel held by said holding means and in the direction of said center line.

5. The press of claim 1 and including a wheel gauge carriage having means for guiding it for reciprocative motion parallel to said center line and offset therefrom, and means for connecting said carriage with one of said centers so that said reciprocation of this center for any distance moves said carriage in the same direction a distance equal to one half of said distance this center reciprocates.

6. A railroad wheel press including a cooperating stationary vertical bed and horizontally reciprocating vertical platen each having an opening and a horizontal guideway extending backwardly therefrom, an axle center member reciprocating in said guideway in each instance and having an end adapted to project forwardly therefrom with said end terminating with an axle lathe center point, said points being axially aligned and forming an operating center line for the press, each of said ends having a cross sectional size permitting it to project through said opening and a railroad wheel hub bore, vertical wheel chucks mounted on the fronts of said bed and platen in each instance and having jaws for gripping the rims of railroad wheels and means for moving said jaws concentrically with respect to said center line, each of said bed and platen having mounted thereon retractable abutments for railroad axle and wheel hub ends respectively, a reciprocating reversible means connected between said bed and the center member in its guideway and a corresponding motor connected between said platen and the center member in its guideway, and means for reciprocating said platen forwardly from a retracted position where said chucks hold said wheels interspaced wider than the length of said axle.

7. The press of claim 6 and including a rocker mounted to rock transversely with respect to said center line and therebelow and between said bed and platen, and two axle saddles mounted on said rocker and shaped to respectively deliver said axles to and remove them from a location parallel to said line but with their lathe centers a little therebelow so that forward reciprocation of said centers causes their points to wedge or unwedge in the axle's lathe center recesses with consequent lifting or lowering of said axle.

8. The press of claim 6 and including a wheel gauge carriage and means for mounting it to travel parallel to said center line, a pinion mounted on said carriage and two pinion racks respectively meshing diametrically with said pinion, one of said racks being connected to and moved by said axle center in the guideway of said bed and the other being connected to and moved by said platen.

9. The press of claim 7 in which said chuck jaws are radially opening to radially receive the railroad wheels and axially opening to release said wheels.

10. The press of claim 8 and including interspaced wheel gauging limit switches mounted on said carriage, and an automatic press control system including automatic means actuated by the one of said limit switches adjacent to said bed for actuating said bed's wheel hub abutment and retracting the bed's axle end abutment and for actuating said platen's wheel hub abutment and retracting said platen's axle end abutment, and means responsive to operation of said automatic means for causing said platen's reciprocating means to move said platen forwardly and to stop moving in response to actuation of the other of said wheel gauging limit switches.

References Cited in the file of this patent

UNITED STATES PATENTS

| | | |
|---|---|---|
| 799,229 | Fildes | Sept. 12, 1905 |
| 1,054,557 | Jehsehius | Feb. 23, 1913 |
| 2,655,718 | Haegele | Oct. 20, 1953 |
| 2,906,012 | Rothfuchs et al. | Sept. 29, 1959 |
| 2,934,819 | Sorenson | May 3, 1960 |